Oct. 2, 1951     R. F. LOUGHRIDGE     2,570,135
MOVING STAIRWAY
Filed July 19, 1948     3 Sheets-Sheet 1

Inventor
Robert F. Loughridge

Oct. 2, 1951   R. F. LOUGHRIDGE   2,570,135
MOVING STAIRWAY
Filed July 19, 1948   3 Sheets-Sheet 2
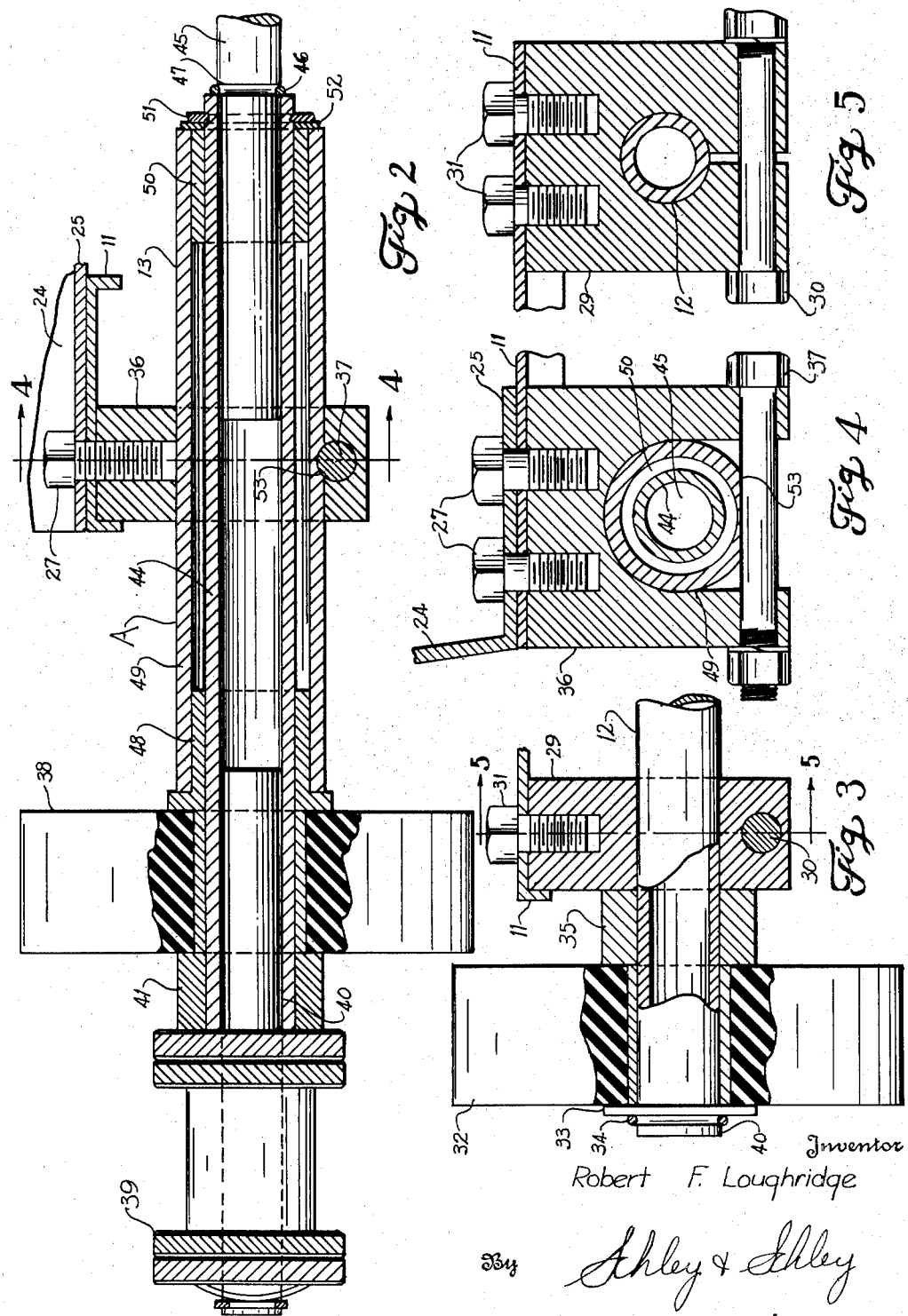
Inventor
Robert F. Loughridge
By Ashley & Ashley
Attorneys Oct. 2, 1951 R. F. LOUGHRIDGE 2,570,135
MOVING STAIRWAY
Filed July 19, 1948 3 Sheets-Sheet 3

Inventor
Robert F. Loughridge
By Schley & Schley
Attorneys

Patented Oct. 2, 1951

2,570,135

UNITED STATES PATENT OFFICE 2,570,135

MOVING STAIRWAY

Robert F. Loughridge, Fort Worth, Tex.

Application July 19, 1948, Serial No. 39,399

9 Claims. (Cl. 198—16)

This invention relates to new and useful improvements in moving stairways and more particularly to steps therefor and the mounting thereof.

One object of the invention is to provide an improved mounting for an escalator step wherein the driving axle includes a plurality of telescoping sections with its wheels and step supports disposed inwardly of its driving chain whereby the step and its wheels may be removed without disturbing the chain or adjacent steps, said step having a removable tread to facilitate access to the driving axle.

Still another object of the invention is to provide an improved moving stairway, of the character described, which includes a removable track section so as to permit outward pivoting of the step to facilitate removal of a step bodily.

A construction designed to carry out the invention will be hereinafter described together with other features of the invention.

Figure 1:
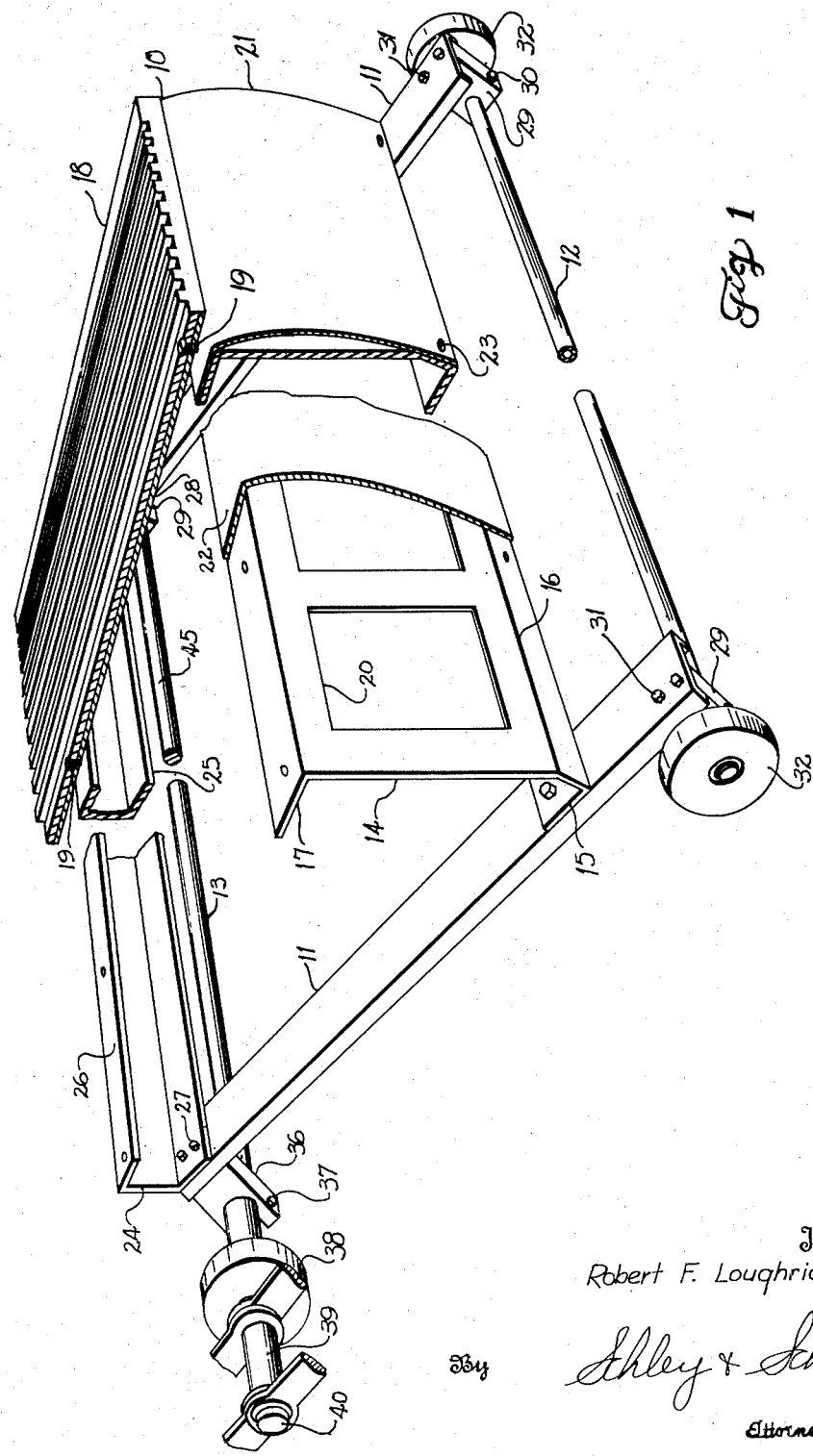
Figure 6:
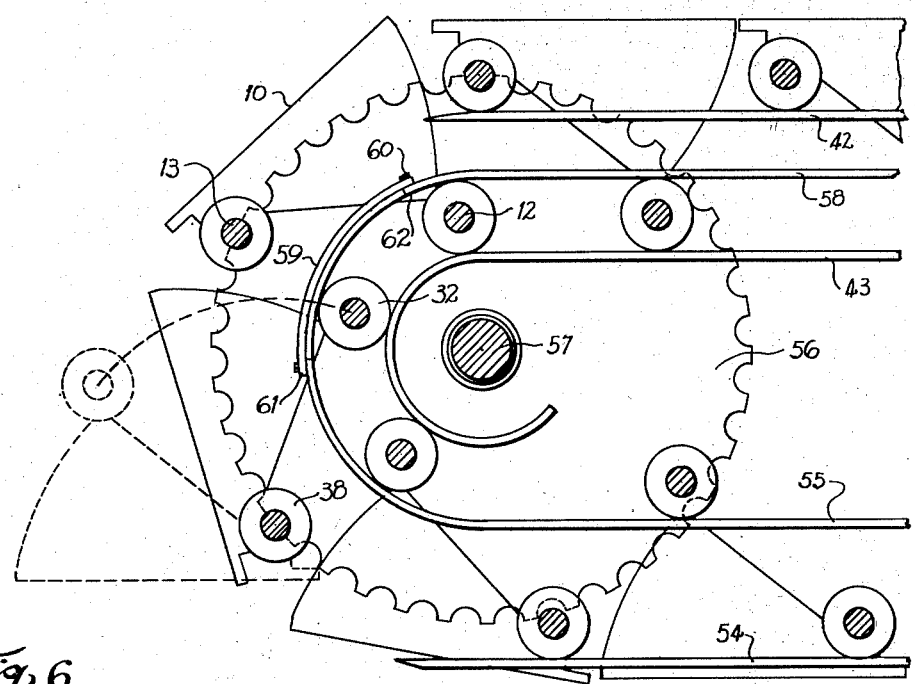
Figure 7:
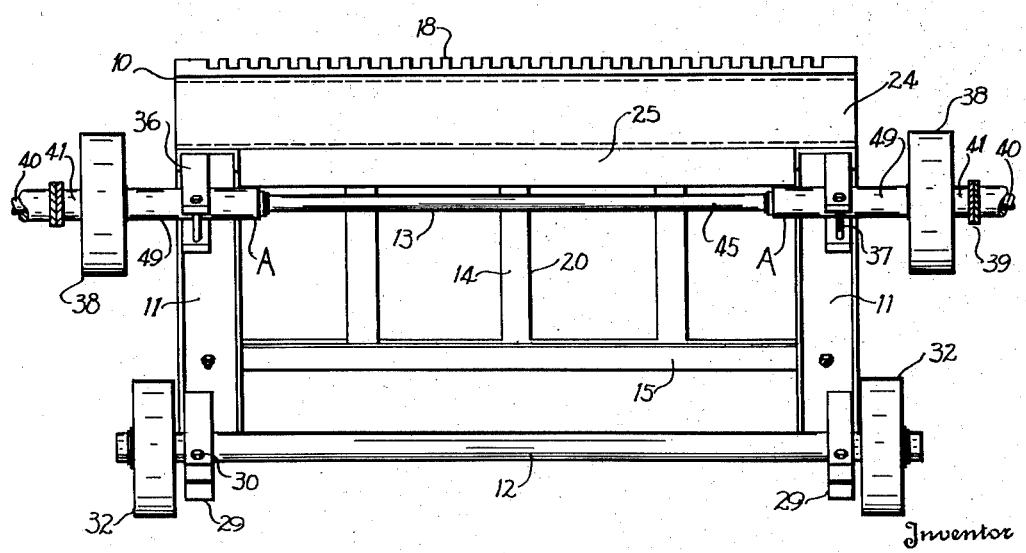

The invention will be more readily understood from a reading of the following specification and by reference to the accompanying drawings, wherein an example of the invention is shown and wherein:

Fig. 1 is a perspective view, partly in section, of a step for moving stairway constructed in accordance with the invention, Fig. 2 is a longitudinal, sectional view of a portion of the driving axle of the step, Fig. 3 is a longitudinal, sectional view of a portion of the front or trailing axle, Fig. 4 is a transverse, sectional view, taken on the line 4—4 of Fig. 2, Fig. 5 is a transverse, sectional view, taken on the line 5—5 of Fig. 3, Fig. 6 is a vertical, sectional view of one end or landing of a moving stairway, showing the removable section of the track, and Fig. 7 is a rear elevation of the step.

In the drawings, the numeral 10 designates a step for a moving stairway or escalator which includes a pair of truck bolsters 11 mounted in spaced, parallel relation upon a front or trailing axle 12 and a rear or driving axle 13. A riser 14 projects upwardly from the bolsters 11 adjacent the front axle 12 and has a rearwardly-directed flange 15 at its lower margin bolted or otherwise fastened to said bolsters. Above the flange 15, the riser 14 is bent rearwardly upon itself as shown at 16 so as to extend substantially vertically or upright. A flange 17 is formed at the top of the riser in overlying relation to the lower flange for supporting the forward edge portion of a tread 18 which is secured thereto by suitable screws 19. The upright portion of the riser has cutouts 20 therein to reduce the weight of the same and is covered by a curved face plate 21 of thin, light-weight metal. A flange 22 is formed at the top of the face plate 21 for confinement between the riser flange 17 and the tread 18, while the lower margin of said plate is attached by screws or rivets 23 to the lower portion of the riser.

The rear edge portion of the tread is supported by a channel-shaped bracket 24 which extends between the bolsters in longitudinal alinement with the driving axle 13 and which has its bottom leg 25 bent downwardly so as to dispose its upper leg 26 in horizontal alinement with the top flange of the riser. The tread projects rearwardly beyond the bracket 24, being connected to the top leg 26 thereof by the screw 19. Suitable bolts 27 fasten the bottom leg 25 of the flange to the bolsters. The tread is grooved in the usual manner, being formed of relatively hard rubber and having a reinforcing plate 28 embedded or mo'ded therein.

As is most clearly shown in Figs. 3 and 5, suitable bearing blocks 29 are clamped on the trailing axle 12 by bolts 30 and are attached to the underside of the forward ends of the bolsters by bolts 31. The ends of the axle extend beyond the blocks 29 and have wheels or rollers 32, of rubber or other suitable material, mounted thereon by means of washers 33 and snap rings 34. A spacer 35 is preferably interposed between each wheel 32 and the adjacent block. Similar clamping blocks 36 and bolts 37 are carried by the driving axle 13 and are fastened beneath the rear ends of the bolsters by certain of the bolts 27 (Figs. 2 and 4). The ends of the axle 13 project an appreciable distance beyond the blocks 36 and have wheels or rollers 38, similar to the wheels 32, mounted thereon. Externally of the wheels 38, endless running gear chains 39 of the double-link roller type are connected to the axle by means of stub shafts 40 which extend through certain of the rollers of the chains. Each chain 39 is spaced from the adjacent wheel by a spacer 41. It is noted that the wheels 38 are spaced outwardly of the wheels 32 that said wheels are adapted to ride upon outer and inner upper run tracks 42 and 43 respectively, the tracks 42 being disposed above the tracks 43 at each landing (Fig. 6).

The axle 13 is formed of a plurality of telescoping sections which preferably include a pair of assemblies A, one at each end of said axle and each having an internal positioning tube or sleeve 44 for receiving the inner end of one of the stub shafts 40 (Figs. 2 and 7). If desired, the stub shaft and sleeve may be formed integrally and, when formed separately, the same are sweated or otherwise secured together. An intermediate or central shaft 45 has one end portion rotatably engaging in each tube 44, being held against relative longitudinal movement by a suitable clip or snap ring 46 which is confined in an annular groove 47 formed in each end of the shaft and bearing against each tube end. It is noted that the shaft 45 is of less length than the distance between the inner ends of the stub shafts 40 so as to permit telescoping movement and disengagement of said shaft 45 from the tubes upon removal of one or both of the snap rings. One wheel 38 is journaled upon each tube 44 between one of the spacers 40 and a flanged bearing collar 48. The latter rotatably supports the outer end of an external positioning tube or sleeve 49 and a suitable bearing collar 50 is interposed between the inner end of this sleeve and the internal tube. For holding the tubes in fixed relation, the inwardly projecting end of the internal tube is circumferentially grooved for receiving a clip or snap ring 51 which confines a washer 52 against the ends of the external tube and its bearing collar 50. A transverse groove 53 is formed in each tube 49 so as to receive the clamping bolt 37 of the block 36 and hold said block as well as the bolster 11 and step 10 against lateral movement (Figs. 2 and 4).

Due to the sectional or telescoping arrangement of the axle, installation of said axle, its wheels and chains as well as repair of the same is facilitated. One chain or wheel may be installed or removed without installing or removing the other. The shaft 45 may be inserted or removed without disturbing the end assemblies of the axle. So long as the step is not in place, either end assembly may be readily broken down to permit replacement of the wheel carried by the same or for other purposes. By removing the screws 19, the tread 18 may be detached to permit access to the axle and removal of the clamping bolts 37. The shaft 45 is then telescoped within one of the tubes 44 upon removal of one or both of the snap rings 46 and, upon movement of the blocks 36 and bolsters 11 longitudinally of the axle, the step may be disengaged from said axle. The end assemblies of the axle may then be turned relative to each other to permit removal of the shaft. At this point, either or both end assemblies may be dismantled or broken down. Assembly of the axle and step is accomplished in the reverse manner.

Pairs of outer and inner lower run tracks 54 and 55 underlie the tracks 42 and 43, respectively, for supporting the steps during their return travel from one end of the moving stairway to the other (Fig. 6). In order to support the steps and their chains 39 during their reversal of movement from one run to the other, a pair of sprockets 56 are provided at each end or landing of the stairway and are mounted upon a transverse shaft 57. The outer tracks 42 and 54 extend slightly beyond the shaft 57 for supporting the rear wheels 38 until and following engagement of the rear axles 13 with the notches of the sprockets 56. Each inner track 43 has its end portion swung downwardly in an arc about the axis of the shaft, while the inner track 55 is curved or swung on a greater arc about said shaft axis so as to be spaced from its corresponding upper track 43 and permit the passage of the front wheels 32 therebetween. As shown by the numeral 58, each track 55 has an upper, horizontal portion overlying the upper track 43 and serving as a guide or hold-down for the front wheels. In order to permit the removal of a step, the curved portion of each track 55 has a removable section 59 which is secured in place by suitable screws 60. The ends of each section 59 and adjacent portions of the track are reduced in thickness to provide overlapping tongues 61 and 62, whereby the inner surface of the section is flush with and forms a continuation of said track. Thus, there is no interference with the riding of the wheels 32 around the curve of the track. The step may be readily swung outwardly and removed upon disconnection from the rear axle 13. This construction may be incorporated with either end or landing of the moving stairway.

It is noted that the sleeves 44 and 49 are rotatable relative to each other as well as to the wheel 38 and the intermediate shaft 45. Thus, the outer sleeve of each end assembly may turn in accordance with movement of the step and the inner sleeve may remain stationary or turn with either the wheel or the intermediate shaft. Normally, the inner sleeve does not turn and functions as a bearing for the wheel and shafts. This freedom of movement is of importance due to the change of position of the step in approaching the ends of the stairway and passing around the loops from one run to the other.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In a moving stairway, an endless series of steps, an axle for each step including, telescoping sleeve assemblies at the ends of the axle, the step being fastened to the assemblies, a wheel carried by each assembly externally of said step, a shaft extending between and having its ends journaled in said assemblies, the shaft being of a length less than the distance between the outer ends of said assemblies so as to be removable therefrom, and fastening means carried by said shaft for securing the same against axial movement relative to said assemblies.

2. In a step for a moving stairway, a supporting axle including, a pair of spaced telescoping assemblies, each assembly including a pair of telescoping relatively rotatable sleeves, a shaft having its ends engaging within and rotatably supported by the inner sleeves of the assemblies, the shaft being movable longitudinally of said assemblies and being of such length that the same is disengaged from one inner sleeve when telescoped within the other, and detachable fastening means carried by said shaft for preventing relative longitudinal movement thereof.

3. A step for a moving stairway including, a pair of spaced truck bolsters, a tread, riser means connecting one edge portion of the tread to the bolsters, bracket means connecting the opposite edge portion of said tread to said bolsters, an axle having wheels carried by the riser end of each bolster, an axle at the opposite end of said bolsters, the latter axle including a pair of telescoping sleeve assemblies, one assembly being connected to each bolster, wheels carried by the assemblies, a removable shaft extending between and rotatable in said assemblies, and detachable fastening means preventing longitudinal movement of the shaft relative to the said assemblies.

4. A step for a moving stairway including, truck bolsters, riser means, bracket means, a tread connected to the bolsters by the riser and bracket means, an axle having wheels carried by the riser ends of said bolsters, a sectional axle at the opposite ends of said bolsters and including a telescoping sleeve assembly connected to each bolster, and a shaft extending between the assemblies and having its ends rotatably and removably supported therein, the shaft being of a length less than the distance between the outer ends of said assemblies so as to permit inward removal of said shaft upon relative telescoping movement.

5. In a moving stairway, an endless series of steps, an axle for each step including, a pair of spaced sleeve assemblies having inner and outer telescoping tubes rotatable relative to each other, the inner tube geing of greater length than the outer tube, the step being fastened to one of the tubes, a wheel mounted on the other tube externally of said step, a shaft extending between and connecting the assemblies and being of less length than the distance between the outer ends of said assemblies so as to be removable therefrom by axial movement relative thereto, and fastening means for securing the shaft against relative axial movement.

6. The combination set forth in claim 5 wherein the shaft is journaled in the inner tubes of the sleeve assemblies.

7. The combination set forth in claim 5 including, a running gear chain connected to the outer end of each sleeve assembly externally of the wheel, and fastening means detachably securing the telescoping tubes of each assembly against axial movement relative to each other, whereby said tubes may be separated to permit inward removal of said wheel without disturbing the connection of the running gear chain.

8. In a moving stairway, an endless series of steps, an axle for each step including, a pair of spaced sleeve assemblies having inner and outer telescoping sleeves rotatable relative to each other, the inner sleeve being of greater length than the outer sleeve, the step being fastened to said outer sleeve, a running gear chain carried by the outer end of said inner sleeve, a wheel mounted on said inner sleeve between the chain and step, a shaft extending between and removably connected to the inner ends of the assemblies, and fastening means detachably securing the sleeves against axial movement relative to each other, whereby said outer sleeve is removable from said inner sleeve to permit inward removal of said wheel.

9. In a moving stairway, an endless series of steps, an axle for each step including, a pair of spaced sleeve assemblies having inner and outer telescoping sleeves rotatable relative to each other, the inner sleeve being of greater length than the outer sleeve, the step being fastened to said outer sleeve, a running gear chain carried by the outer end of said inner sleeve, a wheel mounted on said inner sleeve between the chain and step, a shaft journaled in the inner ends of the inner sleeves of each assembly and being of less length than the distance between the outer ends of said assemblies so as to be removable from said inner sleeves upon axial movement relative thereto, and fastening means detachably securing each inner and outer sleeve against axial movement relative to each other, whereby said outer sleeve is removable from said inner sleeve to permit inward removal of said wheel.

ROBERT F. LOUGHRIDGE.

REFERENCES CITED

The following references are of record in the file of this patent:

UNITED STATES PATENTS

| Number | Name | Date |
|---|---|---|
| 617,788 | Wheeler | Jan. 17, 1899 |
| 2,085,076 | Dunlop | June 29, 1937 |
| 2,214,580 | Dunlop | Sept. 10, 1940 |
| 2,292,534 | Margles | Aug. 11, 1942 |
| 2,362,856 | Strunk et al. | Nov. 14, 1944 |